US010958959B1

(12) United States Patent
Gibbon et al.

(10) Patent No.: US 10,958,959 B1
(45) Date of Patent: Mar. 23, 2021

(54) AUTOMATIC GENERATION OF AUGMENTED REALITY MEDIA

(71) Applicant: AT&T Intellectual Property I, L.P., Atlanta, GA (US)

(72) Inventors: David Crawford Gibbon, Lincroft, NJ (US); Zhu Liu, Marlboro, NJ (US); Lee Begeja, Gillette, NJ (US); Behzad Shahraray, Holmdel, NJ (US); Eric Zavesky, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/570,454

(22) Filed: Sep. 13, 2019

(51) Int. Cl.
*H04N 21/2668* (2011.01)
*H04N 5/445* (2011.01)
*H04N 21/2187* (2011.01)
*H04N 21/25* (2011.01)
*H04N 21/43* (2011.01)
*H04N 21/234* (2011.01)
*H04N 21/222* (2011.01)
*H04N 21/81* (2011.01)

(52) U.S. Cl.
CPC ..... *H04N 21/2668* (2013.01); *H04N 5/44504* (2013.01); *H04N 21/2187* (2013.01); *H04N 21/222* (2013.01); *H04N 21/23418* (2013.01); *H04N 21/251* (2013.01); *H04N 21/4307* (2013.01); *H04N 21/8106* (2013.01)

(58) Field of Classification Search
CPC ......... H04N 21/2668; H04N 21/23418; H04N 21/222; H04N 5/44504; H04N 21/8106; H04N 21/251; H04N 21/4307; H04N 21/2187; G06K 9/00671; G06K 9/00624; B60K 2370/177; H04M 2203/359
See application file for complete search history.

(56) References Cited

U.S. PATENT DOCUMENTS

| | | | | |
|---|---|---|---|---|
| 6,317,127 B1 * | 11/2001 | Daily | .................... | G06T 15/10 345/629 |
| 7,796,155 B1 * | 9/2010 | Neely, III | ............. | G06T 19/006 348/157 |
| 10,325,410 B1 * | 6/2019 | Smith | .................... | G06T 19/006 |
| 2012/0269494 A1 * | 10/2012 | Satyanarayana | .... | H04N 21/4781 386/248 |
| 2013/0132836 A1 * | 5/2013 | Ortiz | .................. | H04N 1/32101 715/716 |

(Continued)

*Primary Examiner* — Fernando Alcon (57) ABSTRACT

In one example, a method performed by a processing system in a telecommunications network includes acquiring live footage of a event, acquiring sensor data related to the event, wherein the sensor data is collected by a sensor positioned in a location at which the event occurs, extracting an analytical statistic related to a target participating in the event, wherein the extracting is based on content analysis of the live footage and the sensor data, filtering data relating to the target based on the analytical statistic to identify content of interest in the data, wherein the data comprises the live footage, the sensor data, and data relating to historical events that are similar to the event, and generating computer-generated content to present the content of interest, wherein when the computer-generated content is synchronized with the live footage on an immersive display, an augmented reality media is produced.

20 Claims, 4 Drawing Sheets

(56) References Cited

U.S. PATENT DOCUMENTS

| | | | |
|---|---|---|---|
| 2013/0170697 A1* | 7/2013 | Zises | G06T 11/60 |
| | | | 382/103 |
| 2014/0079374 A1* | 3/2014 | Gehring | H04N 21/274 |
| | | | 386/296 |
| 2016/0134911 A1* | 5/2016 | Tetreault | H04N 21/6543 |
| | | | 725/32 |
| 2017/0124769 A1* | 5/2017 | Saito | H04N 5/23238 |
| 2017/0358096 A1* | 12/2017 | Boss | G06T 7/33 |
| 2019/0108558 A1* | 4/2019 | Spivack | G06T 19/20 |
| 2019/0205645 A1* | 7/2019 | Bates | G06F 16/583 |
| 2019/0333320 A1* | 10/2019 | Froy | G07F 17/3211 |
| 2019/0354643 A1* | 11/2019 | Shum | G05D 1/0088 |
| 2020/0334902 A1* | 10/2020 | Yan | G06F 16/245 |

\* cited by examiner

AUTOMATIC GENERATION OF AUGMENTED REALITY MEDIA

The present disclosure relates generally to augmented reality (AR) media, and relates more particularly to devices, non-transitory computer-readable media, and methods for automatically generating and presenting augmented reality media.

BACKGROUND

Augmented reality (AR) is an immersive technology in which the real-world environment is enhanced or augmented with virtual, computer-generated objects. For instance, an AR game might superimpose images of virtual objects, such as characters, over an image of a real-world environment. Alternatively, an AR information system might present a computer-generated overlay over an image of a real-world object, where the overlay contains information about the real-world object in text, graphical, and/or other form. Thus, unlike other forms of immersive technology which may replace the real-world environment completely with a virtual environment, AR media simply alters or augments a user's ongoing perception of the real-world environment by blending the real-world environment with virtual objects.

SUMMARY

In one example, a method performed by a processing system in a telecommunications network includes acquiring live footage of a event, acquiring sensor data related to the event, wherein the sensor data is collected by a sensor positioned in a location at which the event occurs, extracting an analytical statistic related to a target participating in the event, wherein the extracting is based on content analysis of the live footage and the sensor data, filtering data relating to the target based on the analytical statistic to identify content of interest in the data, wherein the data comprises the live footage, the sensor data, and data relating to historical events that are similar to the event, and generating computer-generated content to present the content of interest, wherein when the computer-generated content is synchronized with the live footage on an immersive display, an augmented reality media is produced.

In another example, a non-transitory computer-readable medium stores instructions which, when executed by a processing system in a telecommunications network, cause the processing system to perform operations. The operations include acquiring live footage of a event, acquiring sensor data related to the event, wherein the sensor data is collected by a sensor positioned in a location at which the event occurs, extracting an analytical statistic related to a target participating in the event, wherein the extracting is based on content analysis of the live footage and the sensor data, filtering data relating to the target based on the analytical statistic to identify content of interest in the data, wherein the data comprises the live footage, the sensor data, and data relating to historical events that are similar to the event, and generating computer-generated content to present the content of interest, wherein when the computer-generated content is synchronized with the live footage on an immersive display, an augmented reality media is produced.

In another example, a device includes a processor and a computer-readable medium storing instructions which, when executed by the processor, cause the processor to perform operations. The operations include acquiring live footage of a event, acquiring sensor data related to the event, wherein the sensor data is collected by a sensor positioned in a location at which the event occurs, extracting an analytical statistic related to a target participating in the event, wherein the extracting is based on content analysis of the live footage and the sensor data, filtering data relating to the target based on the analytical statistic to identify content of interest in the data, wherein the data comprises the live footage, the sensor data, and data relating to historical events that are similar to the event, and generating computer-generated content to present the content of interest, wherein when the computer-generated content is synchronized with the live footage on an immersive display, an augmented reality media is produced.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure enhances action-based media by automatically generating and presenting augmented reality media. As discussed above, AR media alters a user's ongoing perception of a real-world environment by blending the real-world environment with virtual objects. AR information can be presented in multiple sensory modalities, including the visual, auditory, haptic, somatosensory, and olfactory modalities. As such, AR can be used to enhance a user's enjoyment of a media by making the media experience more immersive.

One particular genre of media that continues to grow in popularity is action-based media (e.g., live sports). Within this genre, automatically generated data is often used to enhance the viewing experience. For instance, a baseball broadcast may make use of automated systems to integrate real-time statistics (e.g., pitch speed, distance traveled by a home run ball, etc.) into the broadcast. However, providing too much of this type of data during a broadcast can actually detract from the viewing experience, as it may become distracting and/or overwhelming to the viewer.

Examples of the present disclosure summarize analytics generated from live, action-based media and produce computer-generated content that can be combined with the action-based media to create AR media that is viewable on an immersive display. In one example, the computer-generated content can provide a personalized user experience, so that the user does not become distracted or overwhelmed with information in which the user may not be interested. For instance, the user's preferences and interests (or the preferences and interests of a group of users to which the user belongs) can be learned and used to curate the computer-generated content. These preferences and interests may be used to select the type of data presented in the computer-generated content, the style in which the computer-generated content presents the data, and other aspects of the AR media.

Within the context of the present disclosure, the term "immersive display" is understood to refer to a display with a wide field of view (e.g., in one example, at least ninety to one hundred degrees). For instance, head mounted displays, simulators, visualization systems, cave automatic virtual environment (CAVE) systems, stereoscopic three dimensional displays, and the like are all examples of immersive displays that may be used in conjunction with examples of the present disclosure. In other examples, an "immersive display" may also be realized as an augmentation of existing vision augmenting devices, such as glasses, monocles, contact lenses, or devices that deliver visual content directly to a user's retina (e.g., via mini-lasers or optically diffracted light). In further examples, an "immersive display" may include visual patterns projected on surfaces such as windows, doors, floors, or ceilings made of transparent materials.

Figure 1:
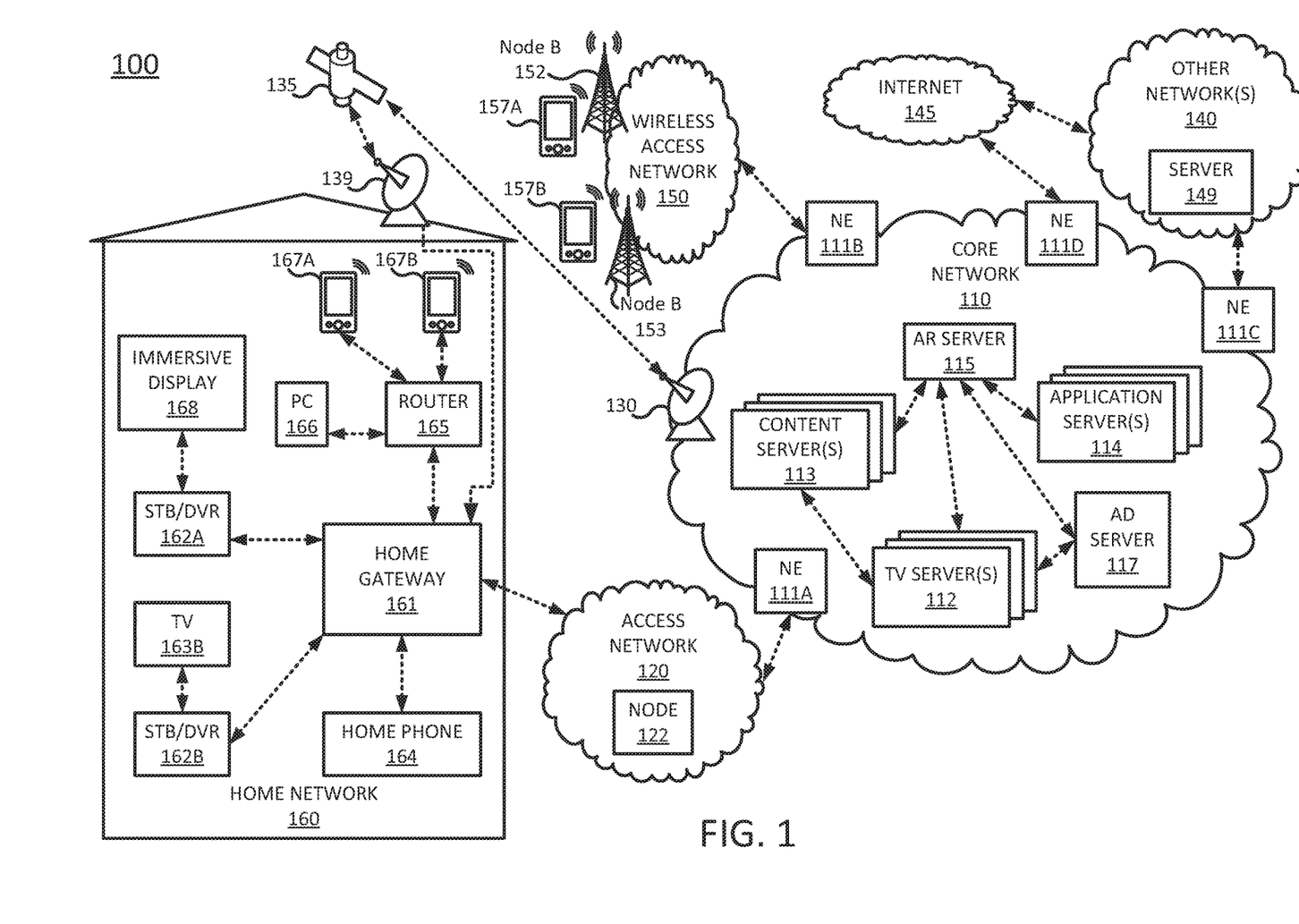
FIG. 1 illustrates an example network related to the present disclosure.

To better understand the present disclosure, FIG. 1 illustrates an example network 100, related to the present disclosure. As shown in FIG. 1, the network 100 connects mobile devices 157A, 157B, 167A and 167B, and home network devices such as home gateway 161, set-top boxes (STBs) 162A, and 162B, television (TV) 163, home phone 164, router 165, personal computer (PC) 166, immersive display 168, and so forth, with one another and with various other devices via a core network 110, a wireless access network 150 (e.g., a cellular network), an access network 120, other networks 140 and/or the Internet 145. In some examples, not all of the mobile devices and home network devices will be utilized in the generation and presentation of augmented reality media. For instance, in some examples, presentation of AR media may make use of the home network devices (e.g., immersive display 168 and/or STB/DVR 162A), and may potentially also make use of any co-located mobile devices (e.g., mobile devices 167A and 167B), but may not make use of any mobile devices that are not co-located with the home network devices (e.g., mobile devices 157A and 158A).

In one example, wireless access network 150 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 150 may comprise an access network in accordance with any "second generation" (2G), "third generation" (3G), "fourth generation" (4G), Long Term Evolution (LTE) or any other yet to be developed future wireless/cellular network technology including "fifth generation" (5G) and further generations. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB).

In one example, each of mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, a wearable smart device (e.g., a smart watch or fitness tracker), a gaming console, and the like. In one example, any one or more of mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, Internet 145, wireless access network 150, access network 120, and so forth. As shown in FIG. 1, core network 110 may also include a plurality of television (TV) servers 112, a plurality of content servers 113, a plurality of application servers 114, an advertising server (AS) 117, and an extended reality (XR) server 115 (e.g., an application server). For ease of illustration, various additional elements of core network 110 are omitted from FIG. 1.

In one example, AR server 115 may generate computer-generated content (e.g., digital overlays) which may be combined with a live media including images of a "real world" environment to produce an augmented reality media. For instance, the AR server 115 may analyze live footage of the real world environment, using content processing and/or computer vision techniques, in order to identify and track targets (e.g., people, objects, or locations of potential interest to a viewer) in the footage. The AR server 115 may also extract information from the footage that can be used to search or filter data relating to the targets. Subsequently, the AR server 115 may use computer graphics, audio synthesis, and/or other techniques to render computer-generated content that presents a subset of the data that is relevant to the target and/or of potential interest to the viewer.

The computer-generated content may include renderings of virtual objects that do not exist in the real world environment, such as graphics, text, audio clips, and the like. However, when the computer-generated content is synchronized with the live footage of the "real world" environment on an immersive display (e.g., over a live video stream of a sports event), it may appear to a viewer that the virtual objects are present in the "real world" environment. For instance, a broadcast of a baseball game may be augmented by superimposing a graphic that traces the trajectory of a home run ball or a pitch that is called for a strike. Alternatively, the broadcast could be augmented by superimposing text or graphics that provide player statistics (e.g., furthest hit, fastest pitch, etc.) or by synchronizing a synthesized color commentary track.

Figure 2:
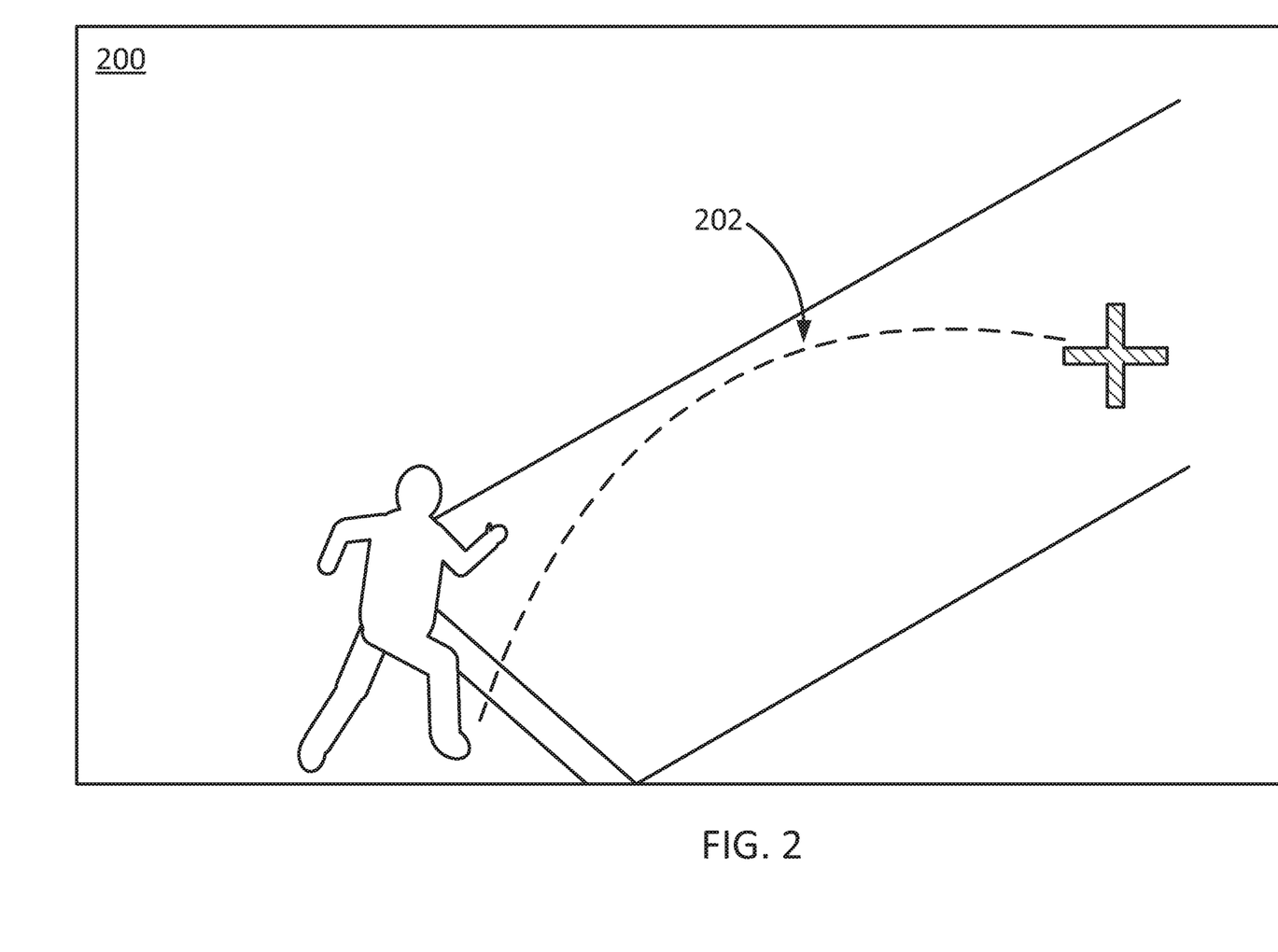
FIG. 2 illustrates an example image that may be augmented by the augmented reality server of FIG. 1.

FIG. 2, for instance, illustrates an example image 200 that may be augmented by the augmented reality server 115 of FIG. 1. In this example, the image 200 may comprise a frame of a video, e.g., an image of a "real world" environment. In the particular example illustrated in FIG. 2, the image 200 is a frame of live video footage from a long jump event, e.g., as might be broadcast during the Olympic Games. More specifically, the example image 200 depicts a long jumper approaching the takeoff board.

An example digital overlay 202 may be generated by the AR server 115 to predict the landing position of the long jumper. In the example illustrated, the digital overlay 115 comprises a dotted line that traces the long jumper's expected trajectory (where the expected trajectory may be calculated by the AR server 115 or another device based on factors such as the speed and the takeoff angle of the long jumper at takeoff, the position of the long jumper's center of gravity at takeoff, the position of the long jumper's feet at takeoff, the style of the long jumper's takeoff, the long jumper's flight technique, and/or the like) and a large X showing the long jumper's predicted landing position. The digital overlay may be adaptively updated in real time, e.g., in response to the acquisition of new data (e.g., factors considered in the trajectory prediction) or in response to a change in the viewer's viewing angle (e.g., if the viewer turns his head while watching on a head mounted display).

When the digital overlay 202 is superimposed over the image 200 as shown in FIG. 2, an augmented reality image is produced. For instance, the example AR image of FIG. 2 allows the viewer to see the predicted trajectory of the jump from takeoff, which culminates in a predicted landing position.

Referring back to FIG. 1, in one example the AR server 115 may collect data provided by users of the network 100. The collected data may be provided directly to the AR server 115 by the users, e.g., via the mobile devices 157A, 157B, 167A, and 167B, the PC 166, the home phone 164, the TV 163, and/or the immersive display 168. Alternatively, the data may be retrieved from network storage, e.g., application servers 114, by the AR server 115. For instance the collected data may comprise user profiles maintained by a network service (e.g., an Internet service provider, a streaming media service, a gaming subscription, etc.), portions of social media profiles maintained by a social media web site (e.g., a social networking site, a blogging site, a photo-sharing site, etc.). The data may indicate information about the users, such as the users' backgrounds (e.g., alma mater, home town, etc.), interests (e.g., favorite sports teams, hobbies, etc.), profession, and the like.

The AR server 115 may also have access to third party data sources (e.g., server 149 in other network 140), where the third party data sources may comprise historical data and statistics relating to various action-based media. For instance, the data and statistics may relate to specific athletes (e.g., batting and fielding statistics for baseball players, career highlights and records, etc.), to specific actions (e.g., hitting of home runs, touchdown passes, free throw shooting, etc.), to specific teams (e.g., historical win-loss records, championships won, etc.), to specific events (e.g., championship games, all-star games, tournaments, etc.) or to other actors and/or items of interest which may appear in action-based media.

In a further example, the AR server 115 may generate an overlay comprising text, graphics, and/or other elements, where the overlay is designed to convey information related to an action-based media (e.g., information about a person, place, or thing appearing in the action-based media). For instance, if the action-based media is a baseball game, the overlay may comprise a graphic tracing the trajectory of a ball that was hit or a bit of text indicating that the hitter has never hit a ball so far. When combined with live camera footage of the action-based media, the overlay may provide an AR media.

The AR server 115 may interact with television servers 112, content servers 113, and/or advertising server 117, to select which video programs, or other content and advertisements to include in an AR media. For instance, the content servers 113 may store scheduled television broadcast content for a number of television channels, video-on-demand programming, local programming content, gaming content, and so forth. The content servers 113 may also store other types of media that are not audio/video in nature, such as audio-only media (e.g., music, audio books, podcasts, or the like) or video-only media (e.g., image slideshows). For example, content providers may upload various contents to the core network to be distributed to various subscribers. Alternatively, or in addition, content providers may stream various contents to the core network for distribution to various subscribers, e.g., for live content, such as news programming, sporting events, and the like. In one example, advertising server 117 stores a number of advertisements that can be selected for presentation to viewers, e.g., in the home network 160 and at other downstream viewing locations. For example, advertisers may upload various advertising content to the core network 110 to be distributed to various viewers. Any of the content stored by the television servers 112, content servers 113, and/or advertising server 117 may be used to generate virtual content which, when combined with live footage of the action-based media, produces an AR media.

Figure 4:
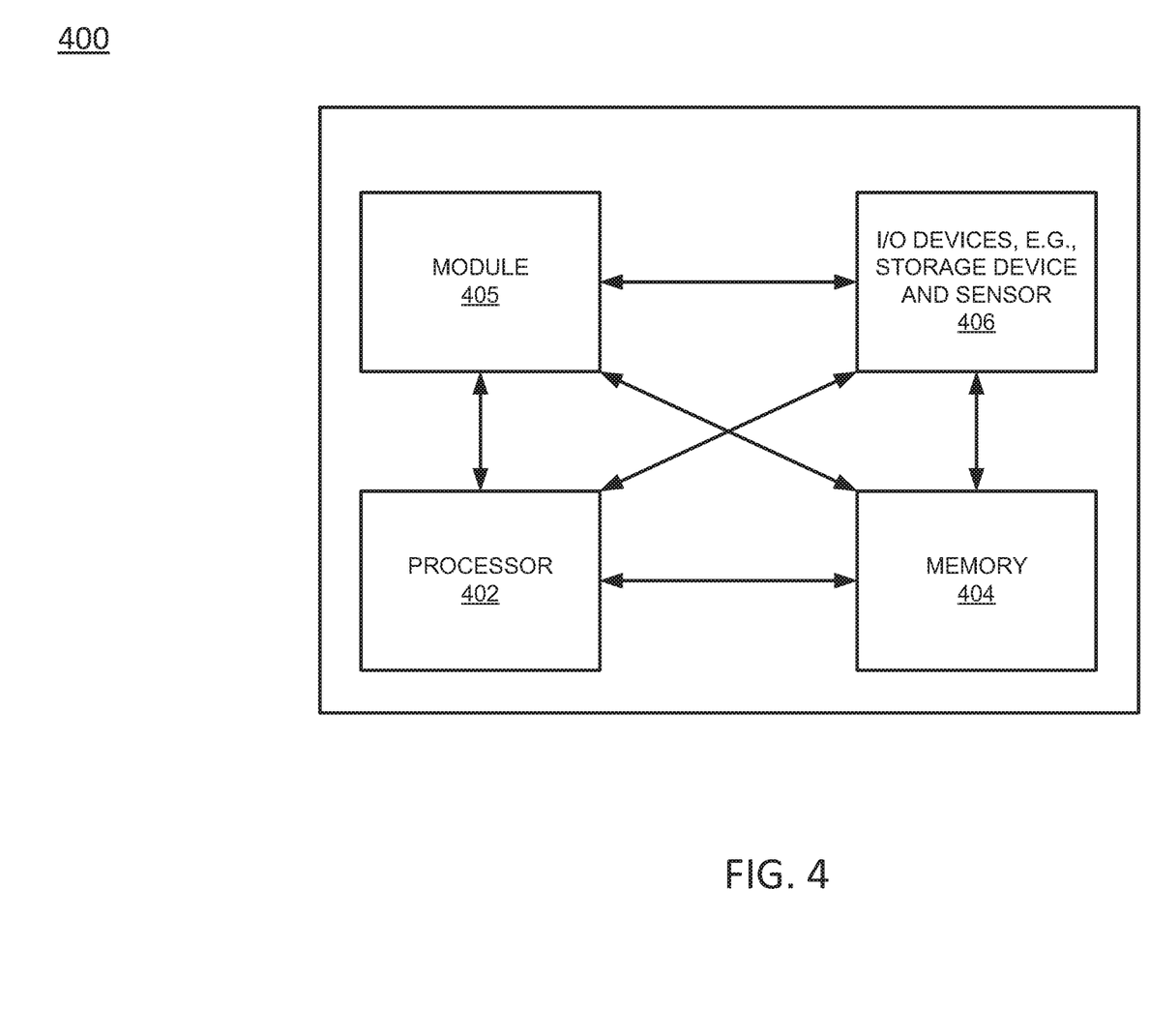
FIG. 4 depicts a high-level block diagram of a computing device specifically programmed to perform the functions described herein.

In one example, any or all of the television servers 112, content servers 113, application servers 114, AR server 115, and advertising server 117 may comprise a computing system, such as computing system 400 depicted in FIG. 4.

In one example, the access network 120 may comprise a Digital Subscriber Line (DSL) network, a broadband cable access network, a Local Area Network (LAN), a cellular or wireless access network, a $3^{rd}$ party network, and the like. For example, the operator of core network 110 may provide a cable television service, an IPTV service, or any other type of television service to subscribers via access network 120. In this regard, access network 120 may include a node 122, e.g., a mini-fiber node (MFN), a video-ready access device (VRAD) or the like. However, in another example node 122 may be omitted, e.g., for fiber-to-the-premises (FTTP) installations. Access network 120 may also transmit and receive communications between home network 160 and core network 110 relating to voice telephone calls, communications with web servers via the Internet 145 and/or other networks 140, and so forth.

Alternatively, or in addition, the network 100 may provide television services to home network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the core network 110. In another example, satellite 135 may be controlled and/or operated by a different entity and may carry television broadcast signals on behalf of the core network 110.

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data is forwarded to set-top boxes (STBs)/digital video recorders (DVRs) 162A and 162B to be decoded, recorded, and/or forwarded to television (TV) 163 and/or immersive display 168 for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A and 167B, and so forth. In one example, router 165 may further communicate with TV (broadly a display) 163 and/or immersive display 168, e.g., where one or both of the television and the immersive display incorporates is "smart" features. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided. For example, one or both of the STB/DVR 162A and STB/DVR 162B may host an operating system for presenting a user interface via TVs 163 and/or immersive display 168, respectively. In one example, the user interface may be controlled by a user via a remote control or other control devices which are capable of providing input signals to a STB/DVR. For example, mobile device 167A and/or mobile device 167B may be equipped with an application to send control signals to STB/DVR 162A and/or STB/DVR 162B via an infrared transmitter or transceiver, a transceiver for IEEE 802.11 based communications (e.g., "Wi-Fi"), IEEE 802.15 based communications (e.g., "Bluetooth", "ZigBee", etc.), and so forth, where STB/DVR 162A and/or STB/DVR 162B are similarly equipped to receive such a signal. Although STB/DVR 162A and STB/DVR 162B are illustrated and described as integrated devices with both STB and DVR functions, in other, further, and different examples, STB/DVR 162A and/or STB/DVR 162B may comprise separate STB and DVR components.

Those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

Figure 3:
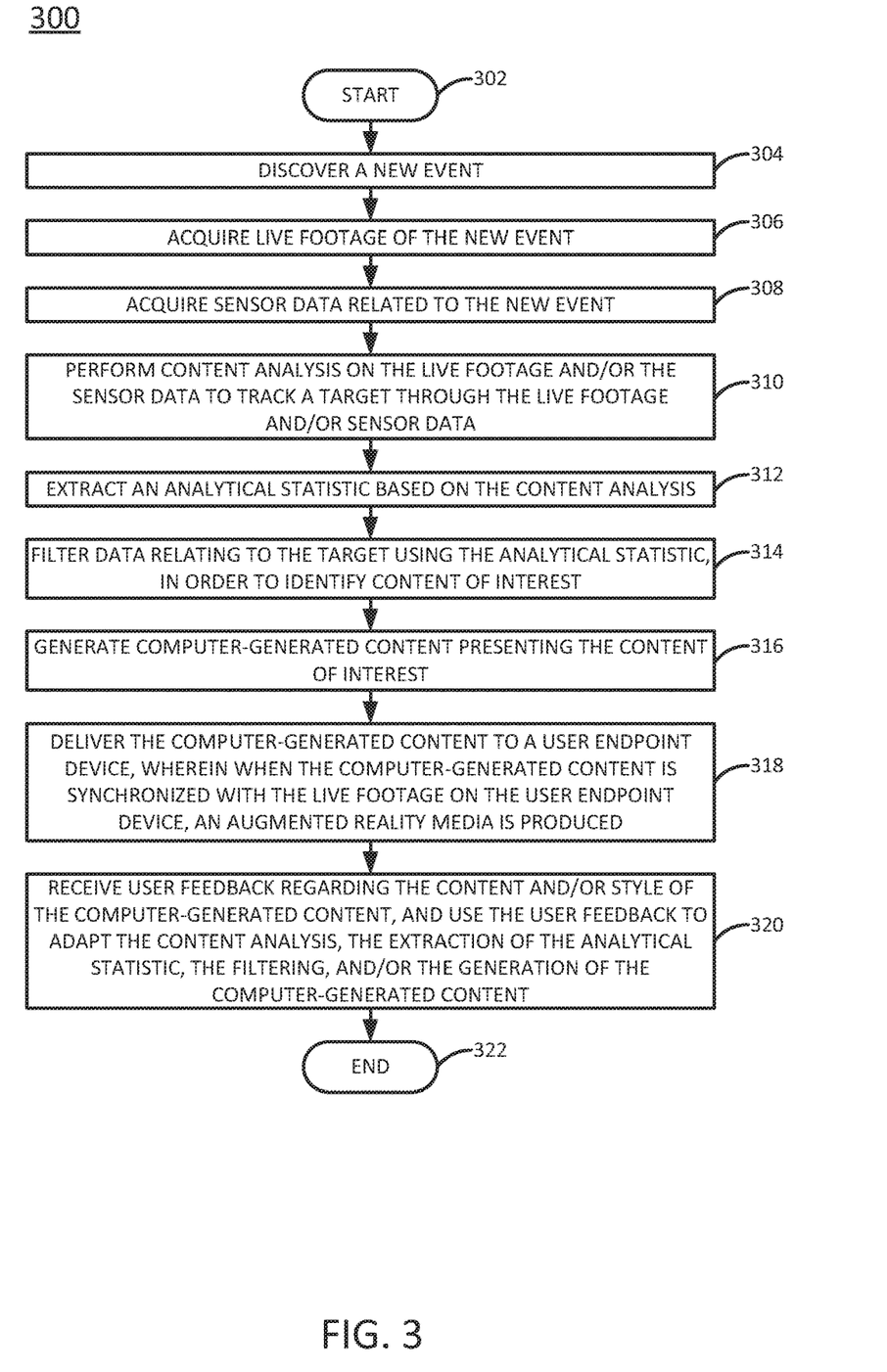
FIG. 3 illustrates a flowchart of a method for automatically generating and presenting augmented reality media.

To further aid in understanding the present disclosure, FIG. 3 illustrates a flowchart of a method 300 for automatically generating and presenting augmented reality media in accordance with the present disclosure. In one example, the method 300 may be performed by an AR server that is configured to generate computer-generated content that may be blended or synchronized with an action-based media depicting a "real world" environment to produce an augmented reality media, such as the AR server 115 illustrated in FIG. 1. However, in other examples, the method 300 may be performed by another device, such as the processor 402 of the system 400 illustrated in FIG. 4. For the sake of example, the method 300 is described as being performed by a processing system.

The method 300 begins in step 302. In step 304, the processing system may discover a new event for which an augmented reality experience is to be generated. In one example, the new event is a live, action-based media (e.g., a sport event). In one example, the new event may be discovered through an active search, such as a review of a public schedule. For example, a television broadcast schedule or a sports team's game schedule may indicate when and how an upcoming game will be available for viewing. In another example, the new event may be discovered passively. For example, a social media user may publish information about an upcoming event. A new event may also be discovered by detecting commonalities in social media postings published by multiple different users. For instance, a plurality of videos uploaded by a plurality of users may contain similar content (e.g., images of the same hit in a baseball game) or be tagged with similar metadata (e.g., indicating a similar time, date, and/or location of video capture). As an example, a plurality of parents attending their children's baseball game may upload videos depicting the game from different (potentially overlapping) perspectives.

In step 306, the processing system may acquire live footage of the new event. In one example the live footage may comprise high-definition video, 360 degree video, volumetric video, or any other type of video. As an example, cameras located throughout a baseball stadium may provide footage of a baseball game. In some examples, the live footage acquired in step 306 may be tagged with metadata that indicates a relative priority of the live footage (e.g., a record-breaking hit) or a reference point related to the live footage (e.g., a section in the stands where a home run was caught). In one example, the live footage may be acquired in real time, e.g., directly from the cameras that are present at the location of the new event.

In step 308, the processing system may acquire sensor data related to the new event. The sensor data may include data from radar sensors, LIDAR sensors, optical depth measurement sensors, infrared sensors, audio sensors, biometric sensors, and other types of sensors. As an example, a radar gun located in a baseball stadium may provide the speed of a pitch, or an optical depth measurement sensor may provide the distance traveled by a ball that was hit for a home run. Computer vision methods may also be used in conjunction with photogrammetry to consolidate multiple optical images into a depth sensitive image. In some examples, the sensor data acquired in step 308 may be tagged with metadata that indicates a relative priority of the sensor data (e.g., a record-breaking hit) or a reference point related to the sensor data (e.g., a section in the stands where a home run was caught). In one example, the sensor data may be acquired in real time, e.g., directly from the sensors that are present at the location of the new event.

In step 310, the processing system may perform content analysis on the live footage and/or sensor data acquired in step 306 and 308, where the content analysis may track a target through the live footage and/or sensor data. For instance, the target may be a person (e.g., a baseball player, coach, or umpire), an object (e.g., a baseball), or a location (e.g., third base) depicted in the live footage. In one example, the processing system may use a recognition technique (e.g., object recognition, facial recognition, voice recognition, character recognition, etc.) to detect the target and to track the target through the live footage, e.g., by computing concurrent movements over time. For instance, an athlete may be tracked through the live footage based on face, name and/or number on jersey, gait, or other distinguishing features. In other examples, analysis of non-visual media may also be performed in step 310. For instance, sentiment analysis of audio extracted from the content can provide information about a target, or voice recognition analysis can provide information on the movement of a target. Other non-visual data, such as non-visual sensor data, temporal offsets of action within the new event, and the like can also be analyzed.

In one example, the target may be defined by a user (e.g., a viewer of the new event). For instance, the user may explicitly request that AR media be generated presenting information related to a specific target (e.g., a favorite baseball player or baseball team). A target could also be inferred from a stored profile associated with the user, where the profile may identify the user's interests (e.g., favorite baseball player or baseball team). In another example, the target may be learned by the processing system, e.g., through observation of similar events, through analysis of time-synchronized social media content (e.g., social media posts indicating that particular targets are noteworthy), or the like.

In step 312, the processing system may extract an analytical statistic based on the content analysis performed in step 310. In one example, the analytical statistic may be extracted by quantifying a change in the target's trajectory (e.g., a change in speed, acceleration, direction, or the like). In one example, the change may be defined relative to some reference point in the content. For instance, a change in the direction traveled by a baseball may be defined relative to the location of home plate, a foul line, a specific defensive position (e.g., short stop), or the like. The reference point may be defined by a user (e.g., a viewer of the new event) or may be learned by the processing system, e.g., through observation of similar events.

In one example, the analytical statistic may be location-based, e.g., in reference to a specific area where the action takes place. For instance, the analytical statistic might indicate the percentages of hits that land in different sections of the outfield, the section of the stands into which the most home runs are hit, or the percentages of pitches that are located in different sections of the strike zone. Furthermore, the analytical statistic may be related specifically to the current location of the target or an object near the target. For instance, the analytical statistic may indicate the probability of a specific baseball player getting a hit based on the location of a pitch.

In another example, the analytical statistic may comprise an anomaly, which may be reported as a binary event. For instance, if a particular pitch by a pitcher is particularly fast (e.g., faster than a threshold speed), this event may be reported as an analytical statistic.

In step 314, the processing system may filter data relating to the target using the analytical statistic, in order to identify content of interest (e.g., portions of the data that may be of interest to a viewer). The data may include the live footage and the sensor data, as well as data relating to historical events that are similar to the new event (e.g., if the new event is an in-progress baseball game, then the data may relate to baseball games that have already been played). For instance, in one example, the analytical statistic may be used as part of a numerical range search (e.g., find all instances in which Player X threw a pitch at least y miles per hour) or a direct identity query (e.g., find all games in which Player Y had zero hits) in order to discover similar actions or events that occurred in the past. As an example, a pitcher's current number of strikeouts may be used to search the content for past instances in which the pitcher's number of strikeouts in a single game exceeded the current number of strikeouts. In another example, the analytical statistic may be used as a search criterion in order to perform a comparison of a specific individual to other individuals. For instance, a baseball player's current number of hits against a specific pitcher may be used as a search criterion to determine whether any other baseball players (of the same team and/or other teams) have more hits against the same pitcher.

In a further example, the viewer's current viewpoint may be used to further filter the content of interest. For instance, the viewer may be watching a baseball game on a head mounted display. In this case, the direction of the viewer's gaze may be estimated to determine where, in the stadium, the viewer is looking, and this estimate may be used to filter the content. For instance, if the viewer is determined to be looking at home plate, then the processing system may search specifically for content related to pitch locations. However, if the viewer is instead determined to be looking toward the outfield, then the processing system may search specifically for content related to typical destinations for the batter's hits (potentially with trajectory traces).

In step 316, the processing system may generate computer-generated content presenting at least some of the content of interest identified through the filtering performed in step 314. In one example, the computer-generated content may comprise a visual overlay that, when superimposed over video footage of the new event, produces an augmented reality experience of the new event. For instance, a graphic that shows where a baseball player's previous hits in a game have landed may be superimposed over live footage of the baseball field. In another example, the computer-generated content may comprise a graphic that summarizes one or more statistics or facts. For instance, the graphic may comprise a chart showing a pitcher's earned run average over several seasons. The graphic could be incorporated into a visual overlay as described above, or could comprise a stand-alone graphic that can be sent to a device for viewing separately from the new event.

In further examples, the computer-generated content may comprise a synthesized announcer or audio track. For instance, rather than a computer-generated content being visual in nature, image-to-text processing techniques may be used to generate a dialogue for an announcer (e.g., play by play, color commentary, etc.). Text-to-speech techniques could then be used to synthesize an audio announcer track that can be synchronized with the new event. In further examples still, the computer-generated content may make use of other modalities including haptic, olfactory, and other modalities.

In step 318, the processing system may deliver the computer-generated content to a user endpoint device. In one example, the computer-generated content may be delivered to the same user endpoint device on which a user is viewing the new event, to be presented as an overlay. For instance, if the user is watching a baseball game on a head mounted display, the head mounted display may visually superimpose the computer-generated content over live footage of the baseball game, as described above. In another example, the computer-generated content may be delivered to a different user endpoint device than the device on which a user is viewing the new event. For instance, if the user is watching a baseball game on his head mounted display, the computer-generated content may be sent to the user's mobile phone for separate viewing (e.g., so as not to distract from the viewing of the game of the head mounted display). Thus, when the endpoint device synchronizes presentation of the computer-generated content with the live footage, an augmented reality media may be produced. It should be noted that computer-generated content and the live footage may be delivered to the endpoint device at different times. However, the computer-generated content may include metadata that allows the endpoint device to properly synchronize presentation of the computer-generated content with presentation of the live footage.

In step 320, the processing system may receive user feedback regarding the content and/or style of the computer-generated content. For instance, the user may indicate that he did or did not like certain aspects of the computer-generated content (e.g., the information was or was not of interest, a visual overlay was too big or too small, etc.). The processing system may use this feedback to adapt certain steps of the method 300 in the future (e.g., by adapting the selection of targets, the statistic-based filtering of data, the generation of the computer-generated content, or other operations).

The method 300 may end in step 322.

Although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the examples of the present disclosure.

Thus, examples of the present disclosure may automatically generate and display AR media by learning potential targets and reference points in live, action-based media, and by analyzing the action-based media with respect to these targets and reference points to generate analytical statistics. The analytical statistics may be used to filter content related to the action-based media. The filtered content may subsequently be incorporated into computer-generated content that can be synchronized with the action-based media, in order to generate AR media. Moreover, because potential reference points and targets may be learned from historical content and/or user feedback, minimal training is necessary to generate the AR media.

Examples of the present disclosure may have a variety of applications in the field of AR media, and especially in relation to action-based media. For instance, examples of the present disclosure could be used to create customized summaries or highlight reels from a user's personal store of action-based media, where the summaries may be focused on specific targets (e.g., athletes, objects, etc.). Different highlight reels may be generated for different users or categories of users. For instance, different highlight reels may be generated for fans, coaches, players, and the like. Such highlight reels may be used to enhance athletic coaching and training efforts.

FIG. 4 depicts a high-level block diagram of a computing device specifically programmed to perform the functions described herein. For example, any one or more components or devices illustrated in FIG. 1 or described in connection with the method 300 may be implemented as the system 400. For instance, a server (such as might be used to perform the method 300) could be implemented as illustrated in FIG. 4.

As depicted in FIG. 4, the system 400 comprises a hardware processor element 402, a memory 404, a module 405 for automatically generating and presenting augmented reality media, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for automatically generating and presenting augmented reality media may include circuitry and/or logic for performing special purpose functions relating to the operation of a home gateway or AR server. The input/output devices 406 may include, for example, a camera, a video camera, storage devices (including but not limited to, a tape drive, a floppy drive, a hard disk drive or a compact disk drive), a receiver, a transmitter, a speaker, a display, a speech synthesizer, an output port, and a user input device (such as a keyboard, a keypad, a mouse, and the like), or a sensor.

Although only one processor element is shown, it should be noted that the computer may employ a plurality of processor elements. Furthermore, although only one computer is shown in the Figure, if the method(s) as discussed above is implemented in a distributed or parallel manner for a particular illustrative example, i.e., the steps of the above method(s) or the entire method(s) are implemented across multiple or parallel computers, then the computer of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for automatically generating and presenting augmented reality media (e.g., a software program comprising computer-executable instructions) can be loaded into memory 404 and executed by hardware processor element 402 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for automatically generating and presenting augmented reality media (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:
acquiring, by a processing system in a telecommunications network, live footage of an event;
acquiring, by the processing system, sensor data related to the event, wherein the sensor data is collected by a sensor positioned in a location at which the event occurs;
extracting, by the processing system, an analytical statistic related to a target participating in the event, wherein the extracting is based on content analysis of the live footage and the sensor data;
filtering, by the processing system, data relating to the target based on the analytical statistic to identify content of interest in the data, wherein the data comprises the live footage, the sensor data, and data relating to historical events that are similar to the event;
generating, by the processing system, computer-generated content to present the content of interest, wherein the computer-generated content includes metadata that indicates how to synchronize presentation of the computer-generated content with presentation of the live footage on an immersive display to produce an augmented reality media; and
delivering, by the processing system, the computer-generated content to a user endpoint device including the immersive display, wherein the user endpoint device is currently acquiring the live footage from a source other than the processing system.

2. The method of claim 1, further comprising:
prior to the acquiring the live footage and the acquiring the sensor data, discovering, by the processing system, an occurrence of the event.

3. The method of claim 2, wherein the discovering comprises reviewing a public schedule on which the event appears.

4. The method of claim 2, wherein the discovering comprises detecting a social media posting about the event.

5. The method of claim 4, wherein the social media posting is one of a plurality of social media postings posted by a plurality of social media users, and wherein the plurality of social media postings includes user-generated video of the event.

6. The method of claim 1, wherein the sensor comprises at least one selected from a group of: a radar sensor, a lidar sensor, an infrared depth measurement sensor, and an audio sensor.

7. The method of claim 1, wherein the sensor data comprises a depth-sensitive image.

8. The method of claim 1, wherein the extracting comprises:
identifying, by the processing system, the target;
tracking, by the processing system, the target through the live footage and the sensor data; and
quantifying, by the processing system, a change in a trajectory of the target based on the tracking.

9. The method of claim 8, wherein the identifying comprises:
receiving, by the processing system, a request from a user to track the target.

10. The method of claim 8, wherein the identifying comprises:
learning, by the processing system, that the target is of interest to a viewer, based on a review by the processing system of historical event that is similar to the event.

11. The method of claim 8, wherein the change in the trajectory is defined relative to a reference point in the live footage.

12. The method of claim 1, wherein the filtering comprises:
performing, by the processing system, a search of the live footage and the sensor data, wherein the search uses the analytical statistic as part of a numerical range query.

13. The method of claim 1, wherein the filtering comprises:
performing, by the processing system, a search of the live footage and the sensor data, wherein the search uses the analytical statistic as part of a direct identity query.

14. The method of claim 1, wherein the computer-generated content comprises a visual overlay that is superimposed over the live footage to produce the augmented reality media.

15. The method of claim 1, wherein the computer-generated content comprises a synthesized audio track generated as the live footage and sensor data are acquired using text-to-speech technology that is synchronized with the live footage to produce the augmented reality media.

16. A non-transitory computer-readable medium storing instructions which, when executed by a processing system in a telecommunications network, cause the processing system to perform operations, the operations comprising:
acquiring live footage of an event;
acquiring sensor data related to the event, wherein the sensor data is collected by a sensor positioned in a location at which the event occurs;

extracting an analytical statistic related to a target participating in the event, wherein the extracting is based on content analysis of the live footage and the sensor data;

filtering data relating to the target based on the analytical statistic to identify content of interest in the data, wherein the data comprises the live footage, the sensor data, and data relating to historical events that are similar to the event;

generating computer-generated content to present the content of interest, wherein the computer-generated content includes metadata that indicates how to synchronize presentation of the computer-generated content with presentation of the live footage on an immersive display to produce an augmented reality media; and delivering the computer-generated content to a user endpoint device including the immersive display, wherein the user endpoint device is currently acquiring the live footage from a source other than the processing system.

17. A device comprising:

a processor; and a computer-readable medium storing instructions which, when executed by the processor, cause the processor to perform operations, the operations comprising:

acquiring live footage of an event;

acquiring sensor data related to the event, wherein the sensor data is collected by a sensor positioned in a location at which the event occurs;

extracting an analytical statistic related to a target participating in the event, wherein the extracting is based on content analysis of the live footage and the sensor data;

filtering data relating to the target based on the analytical statistic to identify content of interest in the data, wherein the data comprises the live footage, the sensor data, and data relating to historical events that are similar to the event;

generating computer-generated content to present the content of interest, wherein the computer-generated content includes metadata that indicates how to synchronize presentation of the computer-generated content with presentation of the live footage on an immersive display to produce an augmented reality media; and delivering the computer-generated content to a user endpoint device including the immersive display, wherein the user endpoint device is currently acquiring the live footage from a source other than the processing system.

18. The method of claim 1, wherein the filtering is further based on a current viewpoint of a user of the user endpoint device.

19. The method of claim 1, wherein the sensor data is tagged with metadata to indicate a relative priority of the sensor data.

20. The method of claim 1, wherein the sensor data is tagged with metadata to indicate a reference location related to the sensor data.

* * * * *